United States Patent [19]

Gardner

[11] 4,144,653
[45] Mar. 20, 1979

[54] INCLINOMETER

[76] Inventor: William L. Gardner, 9818 Etiwanda Ave., Northridge, Calif. 91325

[21] Appl. No.: 905,207

[22] Filed: May 12, 1978

[51] Int. Cl.² ............................................. G01C 9/12
[52] U.S. Cl. ................................................... 33/391
[58] Field of Search .......................... 33/391, 395–402

[56] References Cited

U.S. PATENT DOCUMENTS

| | | | |
|---|---|---|---|
| 2,779,231 | 1/1957 | Drodofsky | 33/402X |
| 2,933,814 | 4/1960 | Thompson | 33/402 X |
| 3,997,976 | 12/1976 | Li | 33/391 |

Primary Examiner—Charles E. Phillips

Attorney, Agent, or Firm—Fulwider, Patton, Rieber, Lee & Utecht

[57] ABSTRACT

An inclinometer having a pendulum means pivotally mounted within a housing, the pendulum having a circular sector member mounted thereon which is rotatively coupled to a roller by means of a coupling strap between the sector and roller. The ends of the coupling strap are fixed in place on the ends of the circumference of the sector and the strap encircles the roller. The roller is coupled to a rotating pointer mounted on the housing. The coupling strap has two parallel sections on one side of the sector which develop into a single section on the opposite side of the sector.

12 Claims, 7 Drawing Figures

INCLINOMETER

BACKGROUND OF THE INVENTION

1. Field of the Invention

The present invention relates generally to inclinometer constructions and, more particularly, to such a construction which couples a pendulum movement to a rotating pointer with increased angular movement.

2. Description of the Prior Art

In the past, some inclinometers which utilized pendulums coupled to pointers for indicating the angle of inclination used straight mechanical coupling between the pivot point of the pendulum and the pointers, such as illustrated by White et al, U.S. Pat. No. 2,956,346 and Barnum, 126,372, in which the angle of the pointer directly tracks the angle of inclination of the pendulum. When this type of construction is used for pendulums for reading relatively small angles of inclination, such as the angle of heel of a sailboat, which is typically no more than 35°, the arc through which the pointer swings is relatively small and reading the inclinometer is difficult.

In other prior art inclinometer constructions, the arc through which the pointer moves is increased compared to the arc through which the pendulum swings. Such prior art constructions have typically used a gearing arrangement between the pivot point of the pendulum and the pivot point of the pointer. Illustrative constructions are shown in Stockton, U.S. Pat. No. 3,599,340 and Norgaard, 1,709,227. However, as in most gearing arrangements, there is usually a relatively large amount of friction which can result in incorrect readings or relatively slow movement of the pendulum when small angles of inclination are measured.

Thus, there has been a need for an inclinometer construction used for measuring relatively small angles of inclination which provides a substantially friction-free mechanism for increasing the movement of the pointer. The present invention satisfies that need.

SUMMARY OF THE INVENTION

The inclinometer construction of the present invention provides a pendulum mounted for pivotal movement within a housing and an arcuate member defining a sector of a circle mounted on the pendulum which is circumferentially adjacent a roller mounted for fixed rotation within the housing. The sector is coupled to the roller by means of a coupling strap which is wrapped around the roller and around the circumference of the sector and fixed to its ends.

Opposite ends of the shaft of the roller pass through arcuate slots in the pendulum and one end of the shaft is connected to a pointer. The amount of increased movement of the pointer is dependent upon the ratio of the radii of the sector and roller.

The coupling strap of the presently preferred embodiment has two parallel spaced strap sections at one end thereof which develops into a single center strap at the opposite end thereof. The parallel strap sections and single center strap have equal areas so that each section is under equal loading forces. Therefore the parallel straps are made half as wide as the center strap. The coupling strap is placed under relatively high tension to insure positive and frictionless coupling between the roller and the sector.

The pendulum assembly is preferably mounted within a relatively close fitting housing containing a viscous fluid, such as oil, to dampen the motion of the pendulum. The bearings for the roller are mounted in elongated bores to allow free vertical movement of the roller to insure that there is no preloading of the bearings due to vertical misalignment.

Thus, the inclinometer construction of the present invention includes a pendulum coupled to a rotating pointer by means of a coupled arcuate sector and roller for substantially frictionless coupling while providing an increased angular movement of the pointer.

These and other features of the present invention will be appreciated from the following detailed description.

DESCRIPTION OF THE PREFERRED EMBODIMENT

Figure 1:
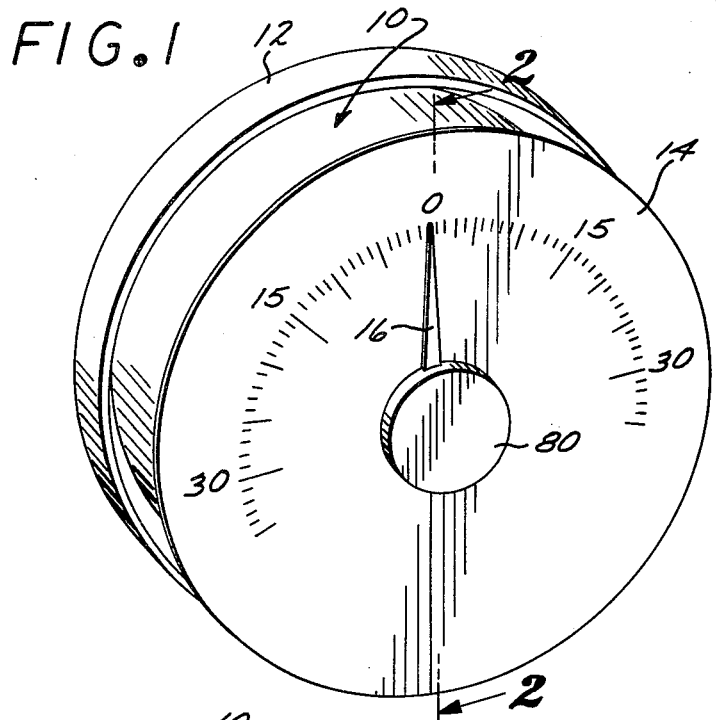
FIG. 1 is a perspective view of an assembled inclinometer showing the dial face and pointer thereof.

Turning now to the drawings, and particularly FIG. 1 thereof, the inclinometer construction of the present invention is basically contained within a cylindrical housing 10 which has a backing plate 12 on one end and dial face 14 graduated degrees of inclination on the opposite end. Centrally mounted on the external surface of the dial plate 14 is a pivotal pointer 16 which rotates in accordance with the inclination of the housing 10 from a basic vertical orientation.

Figure 2:
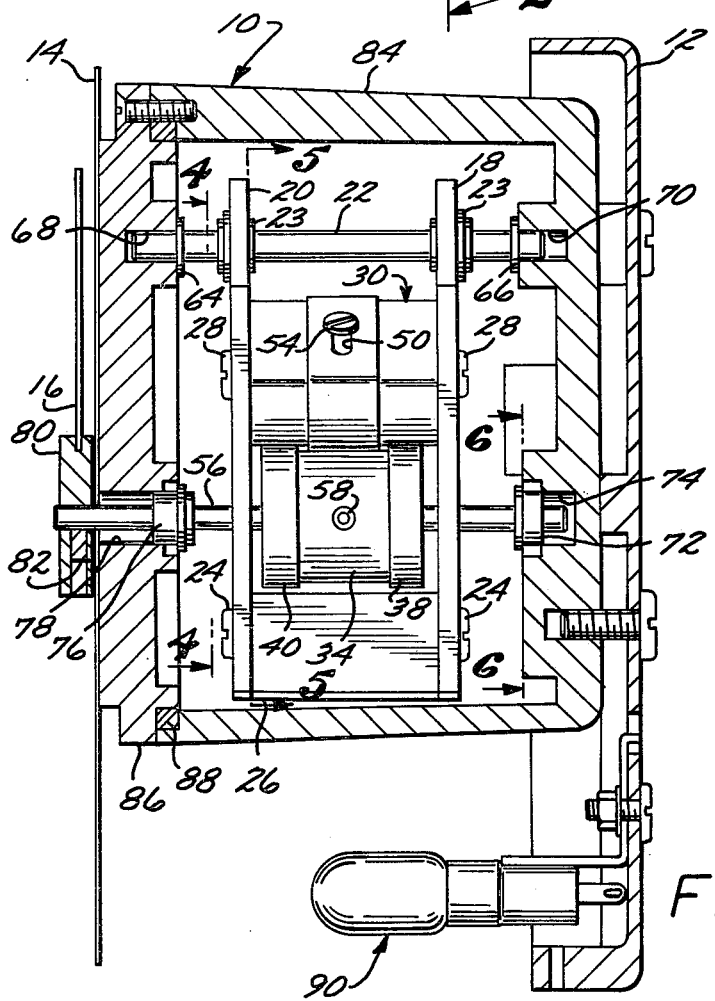
FIG. 2 is an enlarged sectional view taken in the direction of lines 2—2 of FIG. 1.
Figure 4:
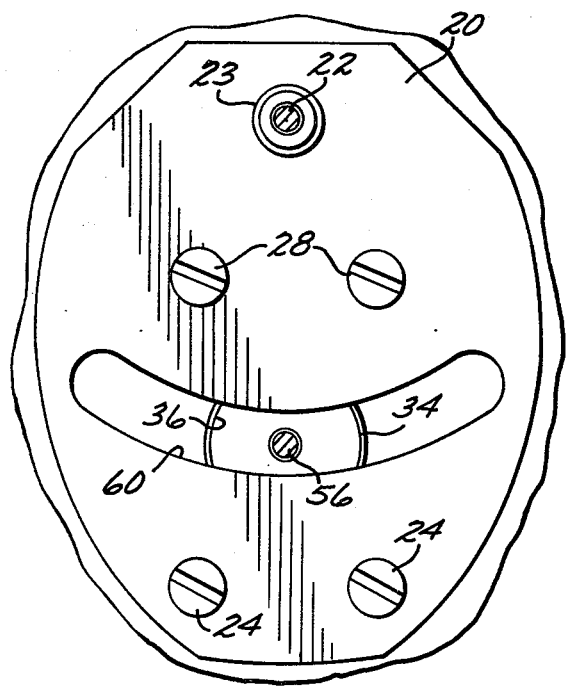
FIG. 4 is a sectional view taken in the direction of lines 4—4 of FIG. 2.
Figure 5:
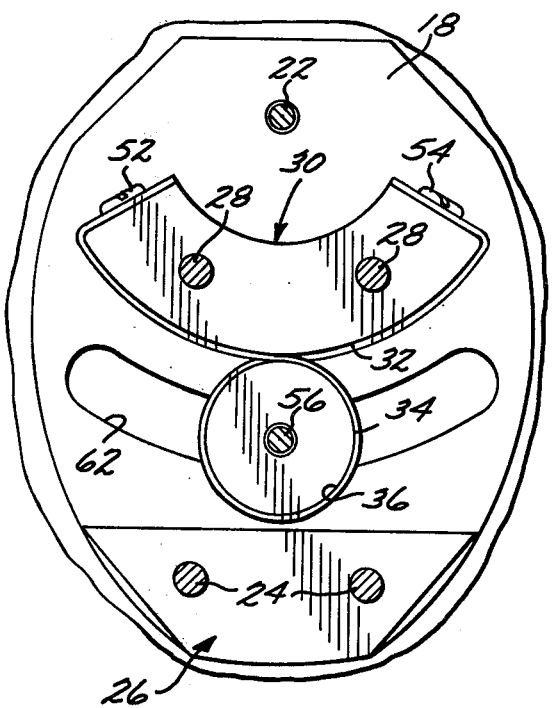
FIG. 5 is a sectional view taken in the direction of lines 5—5 of FIG. 2.

The basic mechanical operation of the inclinometer of the present invention is best illustrated in FIGS. 2, 4 and 5. The pendulum assembly has a back support plate 18 and a spaced front support plate 20 and pivots about a pendulum shaft 22. Mounted between the support plates 18 and 20 at their lower end is a pendulum weight 26 secured by screws 24. Also mounted between the support plates 18 and 20 between the pendulum shaft 22 and the weight 26 and secured by screws 28 is an arcuate member defining a sector 30 of a circle, the outer circumference 32 of which faces the weight 26 (FIG. 5).

Figure 3:
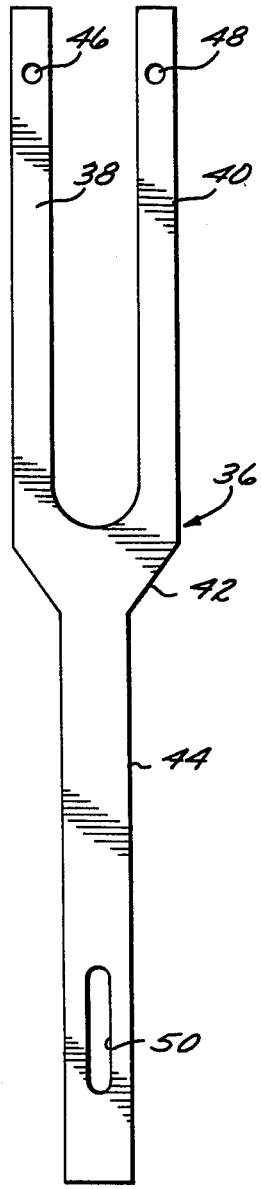
FIG. 3 is a plan view of the coupling strap utilized with the present invention.
Figure 7:
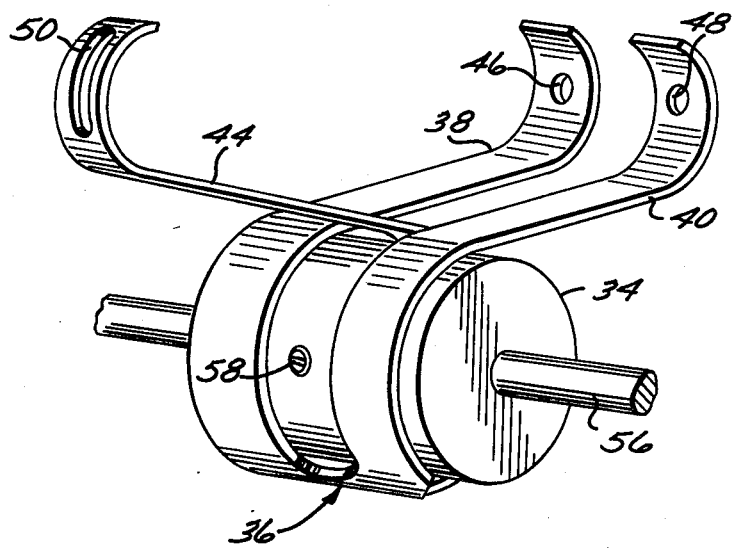
FIG. 7 is a perspective view of the roller and coupling strap utilized with the inclinometer of the present invention.

Loosely mounted between the support plates 18 and 20 is a roller 34 with its circumference tightly coupled to the outer circumference 32 of the sector 30 by means of a coupling strap 36, the details of which are best illustrated in FIGS. 3 and 7. As seen in FIGS. 3 and 7, the coupling strap 36 has spaced parallel sections 38 and 40 at one end which develop at a central point 42 into a single strap 44. The coupling strap 36 is preferably made of a material that is capable of withstanding relatively high tension and flexing, such as beryllium copper shim stock or spring steel. Parallel sections 38 and 40 are provided with mounting holes 46 and 48 while the single section 44 is provided with an adjusting slot 50.

The coupling strap is wrapped around the roller 34 as shown in FIG. 7, with the single section 44 passing between the two parallel sections 38 and 40. The parallel sections 38 and 40 and the single section 44 are then wrapped around the outer circumference 32 of the sector and secured at the outer ends of the sector by means of screws 52 and 54, as shown in FIG. 5. The coupling strap is placed under relatively high tension, approximately 100,000 psi, so that the roller 34 can roll around the outer circumference 32 of the sector 30 with substantially zero friction, a technique relatively well-known in the art. Additionally, both strap and roller are highly polished to reduce both friction and the tendency of the strap and roller to strike together. A roller shaft 56 is placed through the roller and secured by means of a set screw 58. The roller shaft 56 passes through arcuate slots 60 and 62 in the support plates 20 and 18, respectively.

Figure 6:
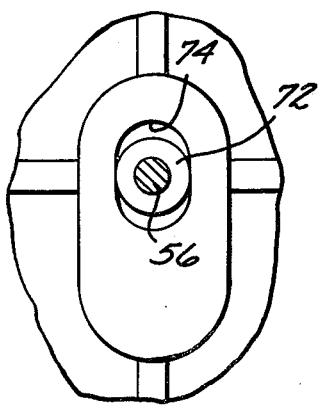
FIG. 6 is an enlarged fragmentary view taken in the direction of lines 6—6 of FIG. 2.

The pendulum assembly is installed within the housing 10, as illustrated in FIG. 2. The pendulum shaft 22 is provided at either end with snap washers 64 and 66 and the ends of the shaft are set in respective bores 68 and 70, with the snap washers 64 and 66 positioning the pendulum assembly within the housing 10. One end of the roller shaft 56 is set in a bearing 72 which is set in a vertically elongated bore 74, as best seen in FIG. 6, to restrain shaft 56 from horizontal movement, but to permit a degree of vertical movement. Similarly, the opposite end of shaft 56 is set in a bearing 76 which is set into a similar elongated bore 78. The end of shaft 56 is also fitted with the pointer which is set into a circular mount 80 held in place on the shaft by means of a set screw 82. The housing 10 includes a cup-shaped housing piece 84 and a front plate 86 sealed to section 84 by means of a sealing ring 88.

Back plate 12 of the inclinometer forms a back plate for the complete housing (not shown) and includes a light bulb assembly 90.

The housing 10 is preferably partially filled with a viscous fluid, such as oil, to dampen the motions of the pendulum as it swings back and forth. In operation, as the housing 10 is rotated, the pendulum remains in a vertical attitude and, considering FIG. 5, as the housing turns, the relative position of the roller 34 with respect to the pendulum changes, thus rolling the roller along the sector 30 with an essentially frictionless contact, without slippage between the roller and sector. The pointer 80, being connected to the roller, then rotates across the face of the dial 14, indicating the inclination of the housing.

Thus, the inclinometer construction of the present invention provides a coupling between a pendulum and a pointer indicator which is essentially frictionless and without slippage, and which provides increased angular motion of the pointer with respect to the motion of the pendulum to permit small angles of inclination to be read easily.

While the inclinometer of the present invention has been described in detail above, it should be appreciated that the invention is not to be limited, except by the following claims.

I claim:
1. An inclinometer, comprising:
a housing;
pendulum means mounted within said housing for movement about a pivot point, said pendulum means having spaced support plates and a weight mounted therebetween, said support plates having arcuate slots therethrough;
an arcuate member defining a sector of a circle having an outer circumference mounted between said support plates;
a roller positioned between said support plates with a shaft of said roller extending through said arcuate slots and the circumference of said roller being adjacent to said outer circumference of said sector;
a coupling strap mounted between said roller and said sector, said coupling strap being wrapped around said roller and fixed to the ends of said sector;
an indicator being mounted on said shaft with said shaft, roller and indicator being rotatable together.
2. The inclinometer defined in claim 1, wherein:
said coupling strap has spaced parallel sections at one end thereof and a single central section at the opposite end thereof, with said single section being positioned between said parallel sections when said coupling strap is wrapped around said roller.
3. The inclinometer defined in claim 1, wherein:
said coupling strap is placed under a tension of approximately 100,000 psi.
4. The inclinometer defined in claim 1, including:
bearing means for mounting said shaft of said roller in said housing, said bearing means having bearings fixed on the ends of said roller shaft which are set in vertically elongated bores in said housing, whereby said roller shaft is restrained against horizontal movement but permitted vertical movement.
5. The inclinometer defined in claim 1, including:
a dial plate mounted on said housing having a centrally located opening therethrough for receiving an end of said roller shaft; and
a dial pointer mounted on said end of said roller shaft for rotation therewith respective to said dial plate for indicating angles of inclination.
6. The inclinometer defined in claim 5, wherein:
said coupling strap has spaced parallel sections at one end thereof and a single central section at the opposite end thereof, with said single section being positioned between said parallel sections when said coupling strap is wrapped around said roller.
7. The inclinometer defined in claim 6, wherein:
said coupling strap is placed under a tension of approximately 100,000 psi.
8. The inclinometer defined in claim 7, including:
bearing means for mounting said shaft of said roller in said housing, said bearing means having bearings fixed on the ends of said roller shaft which are set in vertically elongated bores in said housing, whereby said roller shaft is restrained against horizontal movement but permitted vertical movement.
9. In an inclinometer having a housing with a pendulum mounted within said housing for movement about a pivot point with a weight depended therefrom, having further a dial pointer, the improvement comprising:
an arcuate member defining a sector of a circle mounted on said pendulum;
a roller positioned adjacent said sector;
a coupling strap between said roller and said sector member, said coupling strap being wrapped around said roller and fixed to the ends of said sector member;
said roller having a shaft and being rotatable therewith and said shaft having said pointer mounted thereon and rotatable therewith.
10. The improvement defined in claim 9, wherein:

said coupling strap has spaced parallel sections at one end thereof and a single central section at another end thereof, said single section being positioned between said parallel sections when said coupling strap is wrapped around said roller.

11. The improvement defined in claim 10, wherein: said coupling strap is placed under a tension of approximately 100,000 psi.

12. The improvement defined in claim 9, wherein: a shaft of said roller is fixed in bearings set in vertically elongated bores in said housing whereby said shaft is restrained against horizontal motion while vertical motion is permitted.

* * * * *